3,019,597
JET ENGINE FUEL CONTROL RESPONSIVE TO INFERENTIALLY MEASURED COMBUSTION GAS TEMPERATURE

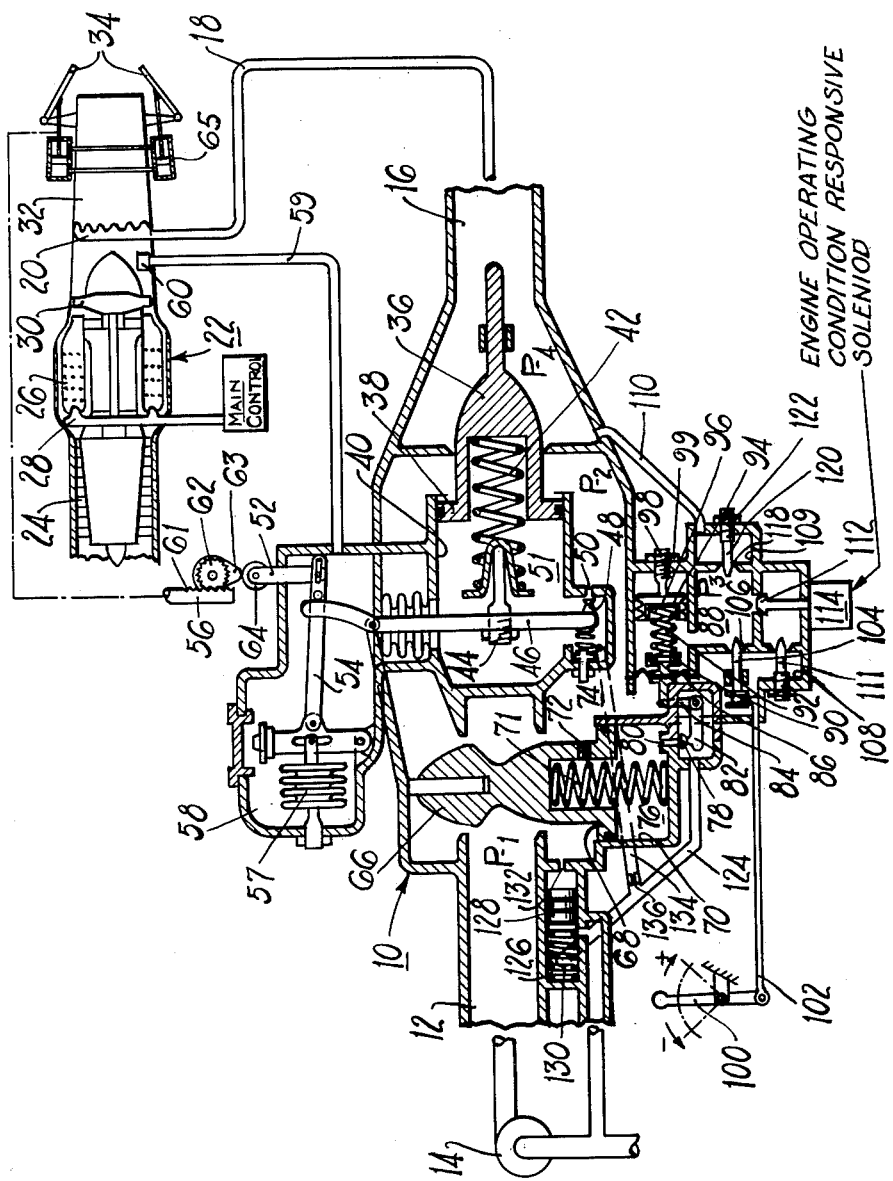

Richard C. German, Samuel E. Arnett, and Elmer G. Roberts, South Bend, Ind., assignors to The Bendix Corporation, a corporation of Delaware
Filed June 20, 1957, Ser. No. 666,877
4 Claims. (Cl. 60—35.6)

This invention relates to fuel systems for jet engines and more particularly to a system for controlling fuel flow to a ram-jet engine or to an afterburner or reheat fuel system for a turbojet engine.

As a means for aiding in the production of maximum thrust from a gas turbine engine, the afterburner has proven extremely valuable. Controlling fuel flow to an afterburner, or a ram-jet, however, presents certain similar problems which must be overcome in order to provide a workable system. While combustion temperatures give a good indication of power output, most afterburner and ram-jet controls avoid the use of direct temperature sensing because of great extremes of heat encountered with consequent destruction or short life of sensing elements. The desired result, therefore, contemplates some means for scheduling fuel flow which will provide nearly optimum performance and yet not require sensing of combustion temperatures, or preferably the sensing of any operating conditions where probes are exposed to such extreme heat. It is also desirable that this scheduling be accomplished through a minimum number of sensed engine control functions. It is, therefore, an object of the present invention to provide an afterburner or ram-jet fuel control which can satisfactorily schedule fuel flow to the engine and which requires actual sensing of a minimum number of engine control functions, which control functions may be sensed with a fair degree of accuracy without requiring unduly heavy or complex equipment.

It is another object of the present invention to provide a fuel system capable of controlling fuel flow in such manner that maximum power output is provided through the use of maximum fuel-air ratios without requiring the sensing of combustion temperatures.

It is another object to provide a fuel control system for ram-jet or afterburner operation which will provide maximum power output without requiring that any probes be directly exposed to combustion temperatures.

It is a further object of the present invention to provide a fuel control for a ram-jet or an afterburner which is structurally light and comparatively simple and straightforward in design.

Other objects and advantages will appear from the following specification taken in connection with the accompanying drawing in which the simple figure is a schematic drawing of a control utilizing our invention in connection with an afterburner for a gas turbine engine.

It has been established that the weight of combustion products ($W_c$) flowing through an orifice is equal to the product of the area of the orifice ($A$), the velocity of the gas ($V$), and the density of the gas ($\rho$). It is also equal to the weight of the air supplied ($W_a$) plus the weight of the fuel ($W_f$).

(1) $$W_c = AV\rho = W_a + W_f$$

Where flow through the orifice is sonic (equals mach 1.0) the velocity may be expressed as follows:

(2) $$V = \sqrt{\gamma g RT}$$

where $\gamma$ = The ratio of specific heats
$g$ = Gravitational constant (ft./sec.²)
$R$ = Gas constant (foot-pounds/pound ° F.)
$T$ = Absolute temperature (° F.)

It is also well known that (3) $$\rho = P/RT$$

where $P$ = static pressure (pounds/ft.²) therefore (4) $$W_c = A\sqrt{\gamma g RT}\, P/RT = \sqrt{\frac{\gamma g}{R}} \frac{PA}{\sqrt{T}}$$

The factor $$\sqrt{\frac{\gamma g}{R}}$$

may be treated as a constant, therefore:

(5) $$W_c = K\frac{PA}{\sqrt{T}}$$

If fuel-air ratio, $$\frac{W_f}{W_a}$$

is made equal to $f$, and $W_c = W_a + W_f$, then it follows that $W_c = W_a + fW_a$ which upon simplification becomes $W_c = W_a(1+f)$. Therefore, (6) $$W_a = K\frac{PA}{\sqrt{T}}\left(\frac{1}{f+1}\right) \text{ which results in } \frac{W_f}{f} = K\frac{PA}{\sqrt{T}}\left(\frac{1}{f+1}\right)$$

solving for $W_f$ (7) $$W_f = K\frac{PA}{\sqrt{T}} \frac{f}{1+f}$$

which is considered a basic equation for fuel flow. If we assume that the nozzle is always operating at sonic velocity, that the engine is operating at maximum power such that the fuel-air ratio is constant, and if the constants are consolidated, the equation may be simplified as follows:

(8) $$W_f = \frac{K_1 PA}{\sqrt{T}} \text{ wherein the constant } K_1 = K\left(\frac{f}{1+f}\right)$$

At maximum fuel-air ratios, the temperature at the burner exit is fairly constant. However, this temperature does vary somewhat with compressor inlet or entering air temperature. Since the nozzle throat area also is a function of inlet temperature, (established by means not a part of the present invention) it can be assumed that at maximum power the temperature of the products of combustion leaving the afterburner is a function of the nozzle throat area such that (9) $$\frac{1}{\sqrt{T_t}} = K_2 f_1(A)$$

where $f_1(A)$ = A predetermined empirical function of the nozzle area
$T_t$ = Absolute temperature of combustion gases
$A$ = Area of the exhaust nozzle opening
$K_a$ = An independent constant The burner pressure loss is nearly constant at maximum fuel-air ratio and the total to static pressure ratio is constant. Hence, the burner inlet total pressure can be substituted for the nozzle throat static pressure thereby making it unnecessary to sense pressure at combustion temperatures.

When a turbojet engine is operated over a wide range of compressor inlet temperatures, the fuel-air ratio of the main combustor varies from, perhaps 0.02 at the low inlet temperatures to 0.01 at the high inlet temperatures. To achieve maximum thrust with afterburning at high inlet temperatures, the afterburner fuel-air ratio must be increased to account for this decrease in main burner fuel-air ratio. With the conventional method of limiting the afterburner fuel by compressor discharge pressure, there is no convenient method of varying the afterburner limit for changes in inlet temperature. If the method set forth herein is used, the nozzle area, which varies with inlet temperature can be used to bias the afterburner fuel-air limit. This effect can be expressed by $$(10) \qquad \frac{f}{1+f} = K_3 f_2(A)$$

wherein $K_3$ is an independent function and $f_2(A)$ is a predetermined empirical function of the nozzle area.

Thus, by substitution, Equation 7 becomes $$(11) \qquad W_f = K_4 P_t A f_1(A) f_2(A)$$
$$W_f = K_4 P_t f_3(A)$$

wherein $$K_4 = (K)(K_2)(K_3) \text{ and } f_3 = A \cdot f_1(A) \cdot f_2(A)(A)$$

From the foregoing it will be apparent that for full power operation, maximum fuel-air ratio may be obtained through the use of a control which senses the burner inlet pressure and the exhaust nozzle area, the function and constants being incorporated into the system by means of cam and valve contours etc.

Referring now to the drawing, our control system is shown generally in a housing 10 having a fuel inlet 12 connected to a centrifugal pump 14 which supplies fuel from a source, not shown. A fuel outlet 16 is connected to a conduit 18 leading to an afterburner fuel manifold 20 of a gas turbine engine 22. Engine 22 consists of a compressor 24, burners or combustion chambers 26 supplied with fuel from a main manifold 28 which is connected to a main fuel control. The hot gases flowing from the combustion chambers 26 drive a turbine 30 and enter a tailpipe 32. A comparatively small percentage of the air is consumed in the main combustion chambers 26 and the remainder of the air, or a substantial portion thereof, is supplied to the afterburner. The exhaust area of the engine is varied by means of a tailgate structure 34.

In the control unit 10, a metering valve 36 is integrally formed with a piston 38 arranged to reciprocate in a cylinder 40. The valve 36 is urged in a closing direction by a spring 42. The compression of spring 42 may be adjusted by means of a threaded member 44 attached to a lever 46. Also attached to said lever is a half-ball servo valve 48 which acts to control the flow of fuel from the upstream side of valve 36 through an orifice 50, and into a servo pressure chamber 51 thereby varying the pressure differential across piston 38. Movement of lever 46 and servo valve 48 is controlled through a series of links (52, 54, 56 etc.) connected to the exhaust area varying mechanism 34 and to pressure sensitive bellows 57 positioned in a chamber 58. A conduit 59 provides a communication between chamber 58 and a pressure probe 60 exposed to the pressure $P_t$ on the discharge side of the turbine. Movement of tailgate mechanism 34, acting through a rack 61 on link 56, drives a gear 62 connected to a cam 63. Cam 63 transmits to a follower 64 and link 52, a movement varying as a desired function of area. The effective area of the metering valve 36, is therefore, controlled as a function of exhaust area (A) and by turbine discharge or afterburner manifold inlet pressure $(P_t)$. The movement of the tailgate mechanism 34 may be controlled by conventional control apparatus, not shown, which does not form any part of the present invention. Such conventional control mechanism includes means whereby a control signal indicative of engine performance or a condition which affects engine performance is sensed by suitable apparatus and transformed into an input signal to hydraulic motors 65 or the like connected to position the tailgate mechanism as a function of the control signal.

The fluid pressure level upstream of the metering valve 36 is controlled by a regulating valve 66 which is formed with a piston 68 adapted to reciprocate in a cylinder 70. Valve 66 is urged in a closing direction by a spring 71. A small bleed 72 is formed in the side of valve 66 providing communication between a regulated fuel pressure $(P_2)$ chamber 74 and a servo pressure chamber 76. The effective servo pressure level in chamber 76 is controlled by means of a half-ball valve 78 which varies the flow through a port 80 in the bottom of chamber 76. Opening of the half-ball valve 78 causes fuel pressure to be dumped through port 80 thereby enabling $P_2$ pressure to overcome the force of spring 71 and move valve 66 in an opening direction, and closing of the half-ball valve causes a fluid pressure build-up which, when added to the force of spring 71, tends to close valve 66. Half-ball valve 78 is attached to a lever 82, which, in turn, is connected to an arm 84 secured to a diaphragm 86 which separates regulated fuel pressure chamber 74 from a modified fuel pressure $(P_3)$ chamber 88. Also secured to diaphragm 86 is a spring retainer 90 which receives one end of a spring 92. The opposite end of spring 92 is positioned in a retainer 94 forming part of a fuel temperature compensating bellows 96. The effective compression of spring 92 may be adjusted by means of a threaded member 98 attached to bellows 96 and a lock nut 99.

The throttle lever 100 is attached to a link 102 which varies the position of a throttle valve 104 in an orifice 106 between a chamber 108, which is an extension of chamber 74, and chamber 88. The throttle valve 104 then varies flow through orifice 106, causing a momentary change in $(P_2 - P_3)$ pressure drop, which is immediately corrected by diaphragm 86 and valve 78. This, in turn, causes a change in the position of regulating valve 66. This change in fuel flow into chamber 88 causes a variation in pressure drop from chamber 88 $(P_3)$ to a chamber 109 which is in communication with metered fuel pressure $(P_4)$ through a conduit 110. A stationary adjustable valve 111 provides a means for calibrating the general flow level from chamber 108 to chamber 88. A step change can be provided by means of an additional valve 112 which is operated by a solenoid 114 and which may be responsive to engine speed, or other variable engine operating condition. Flow into chamber 109 is through an orifice 118 the area of which is adjustable by a stationary threaded valve member 120 and a lock nut 122.

Fuel drained from servo pressure chamber 76 flows through a conduit 124 into a chamber 126 containing a piston-type valve member 128 which is urged to the right by a spring 130 against the fuel pressure which flows through a bleed 132 from a chamber 74. This fuel pressure, except for the delay caused by bleed 132, will be essentially the same as $P_2$. Piston 128 and spring 130 control the flow of servo exhaust fuel to the inlet of pump 14 and act to maintain the pressure differential between $P_2$ and servo exhaust at a uniform value. Fuel from servo chamber 51 also flows to chamber 126 via conduit 134 and restriction 136.

The main fuel flow through the system is from inlet passage 12 $(P_1)$, across regulating valve 66 into chamber 74 $(P_2)$, across metering valve 36 and into the metered fuel chamber $(P_4)$ leading to outlet 16. A parallel fuel flow passage is from chamber 74 to chamber 108 (also $P_2$), across throttle valve 104 to chamber 88 $(P_3)$, across valve 120 to chamber 109 $(P_4)$ and to outlet passage 16. This latter passage may be considered a control conduit because it functions to vary the $(P_3 - P_4)$ pressure drop and hence, the $(P_2 - P_4)$ pressure drop across the metering valve 36. The $(P_3 - P_4)$ pressure drop is effectively requested by the throttle valve 104 which establishes the area of orifice 106. The resulting instantaneous change in $(P_2 - P_3)$ is sensed by means of diaphragm 86 which varies the force on spring 92. The combined action of diaphragm 86 and spring 92 controls the position of half-ball 78 and hence, the effective area of regulating valve 66. The $(P_2 - P_3)$ differential will be maintained as calibrated by the spring 92 and threaded member 98 except for the fuel temperature compensation afforded by bellows 96.

Operation is initiated by movement of the throttle valve 104 to the desired position and by starting pump 14 which may be driven by an air turbine (not shown). Inasmuch as valve 66 is never fully closed, pressure will build up in chambers 74 and 103 and as it builds up in chamber 74 it will exert a downward force on piston 68 and cause valve 66 to move in an opening direction, thereby causing more flow into chamber 74 and building $P_2$ pressure to a still higher level. Increasing $P_2$ pressure also causes diaphragm 86 to move to the right closing servo valve 78. As valve 66 opens, fuel flows through orifice 72 tending to build up pressure in chamber 76 which, added to the force of spring 71, eventually balances the pressure in chamber 74 working against piston 68. Valve 66 then stops until the ($P_2-P_3$) pressure build-up is sufficient to move diaphragm 86 and cause half-ball valve 78 to release some of the fluid pressure in chamber 76. When valve 66 reaches a stabilized position, the pressure drop across metering valve 36 will be stabilized at a value variable essentially only with the position of the throttle valve 104.

The effective area of the valve 36 is directly established by the position of the exhaust area varying mechanism 34 and by the pressure sensed by probe 60 in the engine upstream of the afterburner manifold 20. When the afterburner is started, the mechanism 34 is usually caused to open in order to avoid over-temperatures at the turbine and to maintain the pressure level downstream of the turbine 30 reasonably constant. This opening will result in the translation of a force through link 56, rack 61, pinion 62, cam 63, links 52 and 54 to lever 46 and servo valve 48 of a movement tending to close the valve 48 on orifice 50 thereby allowing servo pressure to be exhausted from chamber 51 and causing valve 36 to be moved in an opening direction under $P_2$ pressure against the force of spring 42. As the afterburner comes into full operation, the tailgate mechanism 34 will stabilize at a given position and any movements in the closing direction initiated by the exhaust area control will cause servo valve 48 to open allowing pressure to build up behind piston 38 thereby moving valve 36 in a closing direction. The pressure sensor 60 and bellows 57 will act to vary the action of the lever 46 and valve 48 with changes in pressure arising from such conditions as changes in engine speed or altitude.

It was set forth above the fuel flow to an afterburner or ram-jet with an exhaust area varying mechanism may be satisfactorily scheduled according to the equation:

$$W_f = KP_t f_3(A)$$

The constant may be incorporated into the system through such means as lever ratios, spring rates etc. The contour of the cam 63 permits the straight area movement of link 56 to be changed to the desired function of the area, $f_3(A)$. The pressure downstream of the turbine ($P_t$) is sensed by pressure probe 60 and bellows 57. Our control therefore provides means for scheduling according to the above equation.

While only one embodiment has been shown and described herein, modifications may be made to suit the requirements of any given application without departing from the scope of the invention.

We claim:

1. In a fuel feeding system for a combustion engine having an exhaust area varying mechanism, a fuel manifold upstream of said mechanism, a conduit for supplying fuel to said manifold, a metering valve in said conduit for controlling the effective flow area thereof, a regulating valve in series flow with said metering valve for controlling the pressure drop thereacross, means in said conduit for pressurizing the fuel therein: a manually operated control member, control means operatively connected to said regulating valve and said manually operated control member for controlling the position of said regulating valve as a function of the position of said control member, means including a temperature responsive member and a member responsive to an engine operating condition which varies with engine power output operatively connected to said control means for modifying the position of said regulating valve as a function of the temperature of the fuel flowing through said conduit and as a function of said engine operating condition, and means for controlling the position of said metering valve including a linkage system incorporating a cam member movable in response to changes in position of said area varying mechanism, follower means operatively connected to the surface of said cam member and said metering valve, and means responsive to a fluid pressure in said engine upstream of said manifold for varying the action of said follower means in accordance with changes in said fluid pressure.

2. A fuel control for a combustion engine having an exhaust area varying means, a source of pressurized fuel, a fuel manifold and a fuel conduit connected between said source and said fuel manifold comprising a metering valve in said conduit for controlling fuel flow therethrough, a regulating valve conected in series with said metering valve or controlling the pressure drop thereacross, means defining a flow path connected in series flow with said regulating valve and in parallel flow with said metering valve, said last named means including a fuel chamber, first valve means disposed upstream of said fuel chamber, second valve means disposed downstream of said fuel chamber, said first and second valve means cooperating to control the fluid pressure in said fuel chamber at a value intermediate the fuel pressures upstream and downstream of said metering valve, manually operated means operatively connected to said first valve means for controlling the position thereof, pressure responsive means responsive to said upstream pressure and said intermediate pressure operatively connected to said regulating valve for controlling the operation thereof such that a substantially constant pressure drop is maintained between said upstream and intermediate pressures, and means for controlling the effective flow area of said metering valve with changes in the position of said area varying means simultaneously with changes in an engine generated fluid pressure which varies with engine power output said last named means including a bellows responsive to said engine generated fluid pressure, a lever pivotally mounted at one end to said bellows and at the opposite end to said area varying means with the position of the lever being dependent upon both the engine generated fluid pressure and position of said nozzle area varying means, and servo means responsive to the position of said lever for controlling the position of said metering valve.

3. In a fuel feeding system for a combustion engine having a turbine, an exhaust area varying mechanism, a fuel manifold upstream of said mechanism, a conduit for supplying fuel to said fuel manifold, a regulating valve and a metering valve connected in series in said conduit for controlling the flow of fuel therethrough to said fuel manifold, and means in said conduit for pressurizing the fuel therein: means for controlling the effective flow area of said metering valve including a linkage system incorporating a lever, a cam member connected to move in response to changes in position of said area varying mechanism, means responsive to turbine discharge pressure, said lever being operatively connected to and actuated simultaneously by said cam and said turbine discharge pressure responsive means such that the position of said lever is always a function of the exhaust area and turbine discharge pressure, and means for controlling the pressure drop across said metering valve including a fluid chamber connected in series flow with said regulating valve and in parallel flow with said metering valve, valve means connected in series flow with said chamber for controlling the flow of fuel therethrough so as to establish a control fuel pressure intermediate in value between fuel pressures upstream and downstream of said metering valve, means responsive to said upstream and intermediate pressures operatively connected to said regulating valve for controlling the operation thereof such that a substantially constant pressure drop is maintained between said upstream and control fuel pressures, manually operated means connected to said valve means for varying the position of said valve means and thus said control fuel pressure to effect a corresponding variation in the flow of fuel through said conduit, and means operatively connected to said pressure responsive means for modifying the pressure drop between said upstream and control fuel pressures in accordance with changes in the temperature of the fuel flowing through said conduit.

4. A fuel control for a combustion engine having an exhaust area varying means, a throttle lever, a source of pressurized fuel, a fuel manifold and a fuel conduit connected between said manifold and said source comprising a metering valve in said conduit for controlling the effective flow area thereof, a regulating valve in said conduit connected in series with said metering valve for controlling the fuel pressure drop thereacross, means defining a flow path in series flow with said regulating valve and in parallel flow with said metering valve, said last named means including a fuel chamber, valve means for controlling the flow of fuel into said chamber, a restriction for controlling the flow of fuel out of said chamber, said valve means and said restriction being operative to control the fuel pressure in said fuel chamber at a value intermediate the fuel pressures upstream and downstream of said metering valve, means responsive to said upstream and intermediate fuel pressures operatively connected to said regulating valve for controlling the operation thereof so as to maintain a substantially constant pressure drop between said upstream and intermediate pressure, said valve means being operatively connected to said throttle lever and movable in an opening direction in response to a selected increase in power output of the engine, whereupon said intermediate pressure is varied to cause opening movement of said regulating valve and a corresponding increase in the pressure drop across said metering valve, servo means for controlling the position of said metering valve, means responsive to the position of said area varying means and to a fluid pressure which varies with engine power output for controlling said servo means, and additional valve means responsive to an engine operating condition which varies with engine power output in parallel flow with said valve means, said additional valve means being operative to cause a variation in fuel flow to said fuel chamber and a corresponding variation in said intermediate pressure whereupon said regulating valve is actuated in an opening or closing direction and the pressure drop across said metering valve is increased or decreased accordingly depending upon the relative change in engine power output.

References Cited in the file of this patent

UNITED STATES PATENTS

| 2,564,107 | Holley | Aug. 14, 1951 |
| 2,736,166 | Mock | Feb. 28, 1956 |
| 2,761,278 | Jonas et al. | Sept. 4, 1956 |
| 2,774,215 | Mock et al. | Dec. 18, 1956 |
| 2,796,136 | Mock | June 18, 1957 |
| 2,844,936 | Fowler et al. | July 29, 1958 |
| 2,957,488 | Farkas | Oct. 25, 1960 |

FOREIGN PATENTS

| 1,109,146 | France | Sept. 21, 1955 |
| 785,803 | Great Britain | Nov. 6, 1957 |
| 1,109,146 | (Corresponding to French Sept. 21, 1955) | |

UNITED STATES PATENT OFFICE

CERTIFICATE OF CORRECTION

Patent No. 3,019,597            February 6, 1962

Richard C. German et al.

It is hereby certified that error appears in the above numbered patent requiring correction and that the said Letters Patent should read as corrected below.

Column 3, line 19, for the equation reading "$f_3 = A \cdot f_1(A) \cdot f_2(A)(A)$" read -- $f_3(A) = A \cdot f_1(A) \cdot f_2(A)$ --.

Signed and sealed this 31st day of July 1962.

(SEAL)
Attest:

ERNEST W. SWIDER
Attesting Officer

DAVID L. LADD
Commissioner of Patent